United States Patent [19]

Schumacher

[11] 4,197,717
[45] Apr. 15, 1980

[54] HOUSEHOLD REFRIGERATOR INCLUDING A VACATION SWITCH

[75] Inventor: Frank A. Schumacher, Louisville, Ky.

[73] Assignee: General Electric Company, Louisville, Ky.

[21] Appl. No.: 863,983

[22] Filed: Dec. 23, 1977

[51] Int. Cl.$^2$ .............................................. F25B 49/00
[52] U.S. Cl. ...................................... 62/213; 62/233; 62/234
[58] Field of Search .......................... 62/233, 234, 213

[56] References Cited

U.S. PATENT DOCUMENTS

| | | | |
|---|---|---|---|
| 2,027,245 | 1/1936 | Nance . | |
| 2,086,622 | 7/1937 | Kagi | 62/234 X |
| 2,174,776 | 10/1939 | Buchanan | 62/213 |
| 2,396,308 | 3/1946 | Williams, Jr. | 62/234 X |
| 2,583,661 | 1/1952 | Morrison | 62/234 X |
| 2,627,393 | 2/1953 | Shell . | |
| 3,126,712 | 3/1964 | Gebert | 62/234 X |
| 3,257,654 | 6/1966 | Rogers et al. | 200/38 DB X |
| 3,584,166 | 6/1971 | Halicho | 200/38 DB |
| 4,056,948 | 11/1977 | Goodhouse | 62/155 |
| 4,123,915 | 11/1978 | Stoor | 62/234 |

OTHER PUBLICATIONS

Popluar Science, Dec. 1976, vol. 209, No. 6, pp. 126–128 & 132, "Tune Your Thermostat to Save Heating Dollars", Evan Powell.

Primary Examiner—Lloyd L. King
Assistant Examiner—William E. Tapolcai
Attorney, Agent, or Firm—Frederick P. Weidner; Radford M. Reams

[57] ABSTRACT

An automatically-defrosting household refrigerator including a user-operable "vacation switch" effective to enable the operation of the refrigerator in a mode appropriate to a condition of zero usage. When the vacation switch is thrown to the vacation position, the user is assured at once that unnecessary energy consumption will be avoided and the likelihood of failure of the refrigerator while unattended will be diminished. The mode appropriate to a condition of zero usage includes having the interval between successive automatic defrosting operations extended. Additionally, the vacation switch may be effective to simultaneously disable an automatic icemaker, to increase the temperature set point of the thermostatic control means which maintains the temperature within the refrigerator to disable anti-condensation heaters, and to disable butter conditioner heaters.

There is further disclosed a particular means for extending the interval between successive automatic defrosting operations. A temperature-responsive switch is mounted so as to be responsive to the temperature of a predetermined portion of the refrigeration system high side. The switch is closed at ambient temperature and opens at a predetermined temperature which is reached by the predetermined portion of the refrigeration system high side a few minutes into each operating cycle of the refrigerator compressor. The temperature-responsive switch is arranged to disable the defrost control timer when the sensed temperature exceeds the predetermined value during each operation of the refrigeration system. During normal operation of the refrigerator, the temperature-responsive switch is bypassed, and the defrost control timer operates normally.

13 Claims, 5 Drawing Figures

HOUSEHOLD REFRIGERATOR INCLUDING A VACATION SWITCH

BACKGROUND OF THE INVENTION

The present invention relates generally to household refrigerators and, more particularly, to a refrigerator operating mode appropriate for an extended period of zero usage such as would occur when a user is on vacation.

Modern automatically-defrosting refrigerators are designed to provide proper and efficient operation during normal usage conditions. During normal usage conditions, temperatures within the refrigerated compartments are maintained at levels appropriate for safe storage of food. The frequency of or, expressed alternatively, the interval between successive automatic defrosting operations is selected to avoid unnecessary defrosting operations and to prevent excessive accumulation of frost on the evaporator under reasonably expected humidity loading conditions. Further, many modern refrigerators include automatic icemakers connected to household water supply lines to conveniently provide a ready supply of ice cubes at all times. Additionally, many modern refrigerators are provided with anti-condensation heaters for heating selected portions of the exterior of the refrigerator cabinet, which portions might otherwise be cooled below the ambient dewpoint, resulting in unsightly condensation forming. Also, butter conditioner heaters are sometimes provided to maintain a butter compartment at a temperature slightly warmer than the remainder of the refrigerated space.

Many of the features and functions mentioned above have been provided with independent control for various reasons. For example, to minimize energy consumption, switches have been provided to turn off anti-condensation heaters during periods of low ambient humidity. For the same reason, various forms of variable defrost interval control have been developed. For example, adjustable defrost control timers have been provided which permit a user to optimize the defrosting interval for particular ambient and usage conditions. Furthermore, various so-called "demand defrost" systems have been proposed whereby the refrigerator control system itself varies the interval between successive defrosting operations depending on various sensed parameters such as door openings and ambient humidity. A simple form of demand defrost is achieved by connecting the motor in the defrost control timer such that it operates only when the refrigerator compressor is operating in response to a thermostatic temperature control. Thus, under high usage conditions when the compressor runs frequently, the defrost control timer accumulates time at a faster rate. During low usage conditions the compressor operates less frequently and the defrost control timer accumulates time at a slower rate. Automatic icemakers customarily are equipped with switches or other means to effectively turn them off when desired. Lastly, most household refrigerators include a user-adjustable thermostatic temperature control for setting a desired temperature to be maintained within at least one refrigerated compartment.

The operating conditions of the various elements of a refrigerator, being designed for normal usage conditions, are in some respects inappropriate for extended periods of non-usage of the refrigerator, such as might occur when a user is away for periods of a week or longer while on vacation ("Non-usage" and "zero-usage" are interchangeably employed herein and are intended to refer to a condition wherein the door of the refrigerator is not opened over an extended period of time, in contrast to a condition where the refrigerator is unplugged or otherwise turned off and placed into storage.)

By suitable adjustment of the refrigerator controls, an operating condition more appropriate to an extended period of zero usage might be achieved. Such an operating condition would be more appropriate both from the standpoint of avoiding unnecessary consumption of energy, and from the standpoint of decreasing the possibility of a failure which, under normal conditions of daily use would be merely an inconvenience, but which, during an extended unattended period of operation could have potentially greater consequences. While serious failures are relatively rare, on a statistical basis there is always some probability of occurrence despite good design practices.

It is therefore an object of the invention to provide a convenient means for a user to affect various operating conditions to place a refrigerator in an operating mode appropriate to a condition of zero usage.

It is a further object of the invention to provide an inexpensive means for effectively extending the interval between successive automatic defrosting operations when appropriate.

SUMMARY OF THE INVENTION

Briefly stated, and in accordance with one aspect of the invention, an automatically-defrosting household refrigerator includes a user-operable "vacation switch" effective to enable the operation of the refrigerator in a mode appropriate to a condition of zero usage. The mode appropriate to a condition of zero usage includes having the interval between successive automatic defrosting operations extended. An extended interval of ten times a normal interval may sometimes be desirable. When the vacation switch is thrown to the vacation position, unnecessary energy consumption is avoided and the likelihood of failure of the refrigerator while unattended diminished.

After operating the "vacation switch," the user is assured at once that he has done all that is necessary, and has avoided the trouble of adjusting various controls. Furthermore, it is unlikely that many users would make any adjustment at all before going on vacation in the absence of a vacation switch.

The term "vacation switch" is employed herein in the specification and claims as a matter of convenience to describe a switch which is operated by the user whenever the refrigerator is unattended for an extended length of time for any reason. Thus, the invention is not intended to be limited to a switch which is operated only for vacation purposes.

There are a number of operations within an automatic refrigerator which the vacation switch may affect according to various aspects of the invention. In particular, as previously mentioned, the interval between successive automatic defrosting operations is extended. During a zero-usage condition, very little ambient moisture enters the refrigerated space to become deposited on the evaporator surface because the door is never open. It would therefore be wasteful to defrost the evaporator as often as is usual. Furthermore, there is always a slight possibility of the defrosting mechanism failing, resulting in a loss of cooling and possible spoilage of food while the refrigerator is unattended. With defrosting operations occurring less frequently, the chances of such a failure occurring are decreased, thus energy saving and increased reliability result.

For refrigerators equipped with automatic icemakers, according to another aspect of the invention the vacation switch is effective to disable the icemaker when the zero usage mode is enabled. Preferably, the means for disabling the icemaker includes a means for preventing the interruption of the icemaker during an ice-ejection cycle, thereby ensuring that the various movable elements of the icemaker are not held out of their resting condition over an extended period of time.

In accordance with still another aspect of the invention, the vacation switch is effective to increase the temperature set point of the thermostatic control means which maintains the temperature within the refrigerator. An increase of approximately 5° F. is appropriate. This decreases the energy consumption because the refrigeration compressor operates less frequently. This is not as harmful to the food preservation qualities of the refrigerator as might be expected. Since the doors at all times are closed, the time-averaged temperature within the refrigerated compartment is closed to what it would otherwise be. During normal usage of the refrigerator, when the door is opened, warm air flowing into the refrigerator frequently increases the temperature therein above that which the refrigerator temperature control system would otherwise allow. In other words, there is a temporary overload on the refrigeration system. As a result, during normal usage conditions, the time-averaged temperature within the refrigerated compartment may be higher than the average temperature nominally maintained by the refrigeration temperature control system.

In accordance with still further aspects of the invention, two specific means for accomplishing the increasing of the temperature set point of the thermostatic control means when the zero usage mode is enabled are contemplated. In one particular embodiment, two separate temperature control thermostats are provided, one being a normal thermostat and the other being a vacation thermostat. The vacation thermostat is adjusted to a higher temperature setting than a normal thermostat, such as 5° F. higher than a nominal setting. A circuit means, for example a switch, alternatively enables the thermostats. The vacation thermostat is enabled in the zero usage mode, and the normal thermostat is otherwise enabled.

In another particular embodiment, there is a single thermostatically controlled means having a temperature sensing element, such as a bulb at the end of a capillary tube, located within the refrigerated space. A small biasing heater, for example one-tenth watt, is thermally connected to the temperature sensing element to bias the temperature sensing element. The biasing heater is ON for normal operation, and turned OFF when the zero usage mode is enabled. For normal operation, the biasing heater causes the temperature sensing element to effectively sense a temperature which is higher than the actual refrigerator temperature. The controls are adjusted to compensate for the biasing heat so that when the thermostatic control means maintains a higher temperature at the temperature sensing element, the temperature within the refrigerated space is the normal desired temperature. When the zero usage mode is enabled by the vacation switch, the biasing heater is disabled and the thermostatic control means responds by effectively increasing the temperature set point.

In accordance with still another aspect of the invention, the anti-condensation heaters for the exterior of the refrigerator case are disabled when the vacation switch is in the vacation position. While operation without the anti-condensation heaters might be unacceptable during certain conditions of normal usage, during extended periods of non-use it is acceptable for at least two reasons. Excessive energy consumption is consequently avoided. Non-operation of the anti-condensation heaters may be tolerated during the zero usage mode, first because condensation is an appearance, not a functional, consideration. Presumably there is no one to observe the appearance. Second, due to the higher temperature maintained within the refrigerated compartments because of the effect of the vacation switch on the temperature control system, there is less cooling of the outer case, and less need for anti-condensation heaters. Thus, there is less visible condensation in any event.

In accordance with still another aspect of the invention, a novel means is provided for extending the interval between successive defrosting operations. To initiate normal defrosting operations, the refrigerator includes a defrost control timer of some sort. In accordance with this aspect of the invention, a particular means is provided for periodically disabling the timing means when the vacation switch is operated to select the zero usage mode. Specifically, a temperature-responsive switch is mounted so as to be responsive to the temperature of a predetermined portion on the refrigeration system high side. The temperature-responsive switch is closed at ambient temperature and opens at a predetermined temperature which is reached by the portion of the system high side selected a few minutes into each operating cycle of the refrigeration compressor. The switch is arranged to disable the timing means when sensed temperature exceeds the predetermined value during each operation of the compressor. In this way, a timing interval is established which controls the timing means on a duty cycle basis, and which is quite inexpensive to implement. During normal operation of the refrigerator, the temperature-responsive switch is bypassed, and the defrost timing means operates normally.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DESCRIPTION OF THE PREFERRED EMBODIMENT

Figure 1:
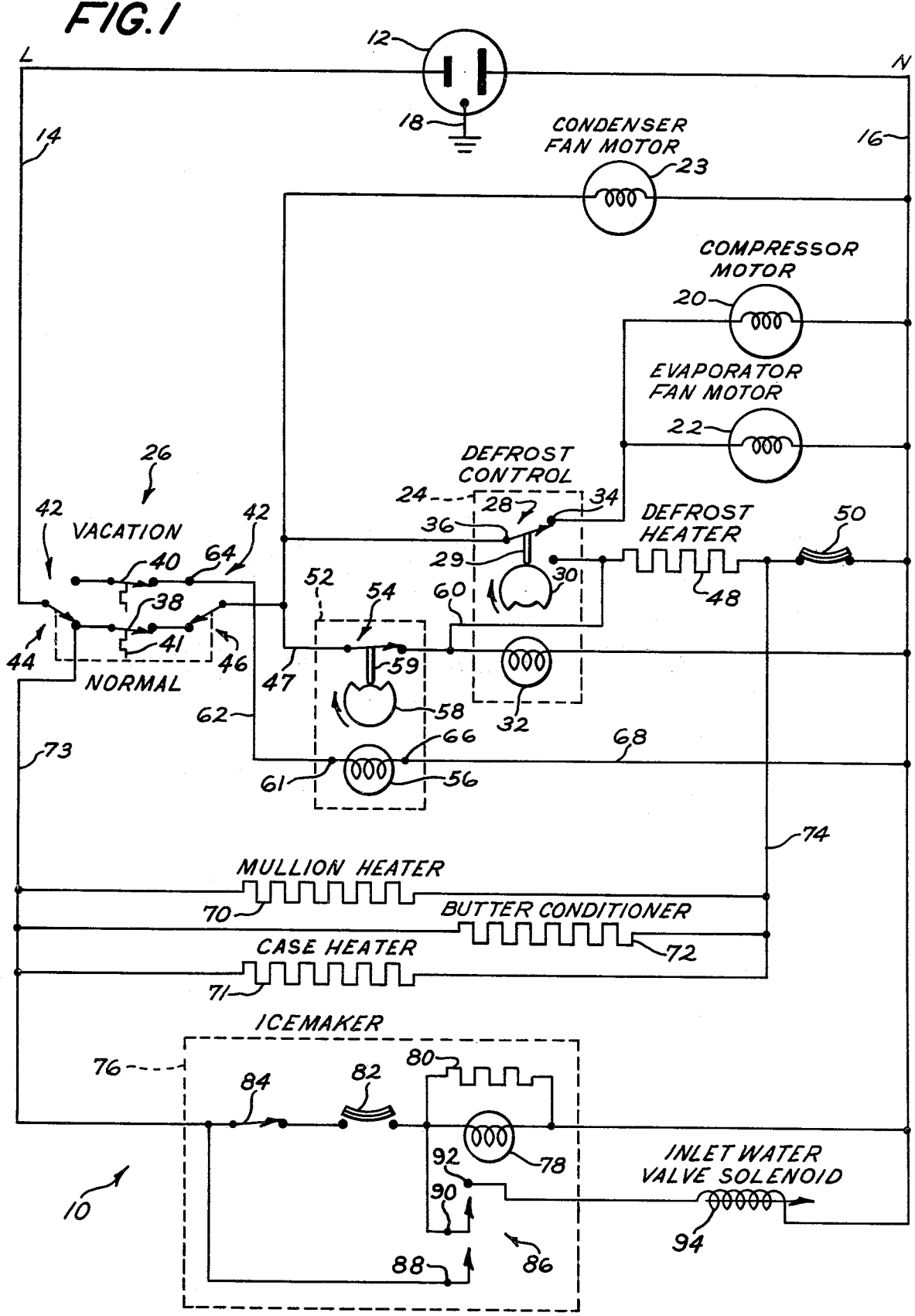
FIG. 1 is an electrical circuit diagram of a refrigerator control system according to one embodiment of the invention.

Referring now to the drawings wherein identical reference numerals refer to corresponding elements throughout the various figures, FIG. 1 shows a refrigerator circuit 10 including one embodiment of the invention. A conventional power plug 12 supplies L and N supply conductors 14 and 16, and has a connection 18 to ground the frame of the refrigerator. A refrigeration system includes a compressor motor 20 and an evaporator fan motor 22 connected in parallel. The refrigeration system further includes a condenser fan motor 23 for forced-air cooling of the compressor.

For controlled operation of the refrigeration system, the compressor and evaporator fan motors 20 and 22 are connected to the L supply conductor 14 through a defrost control 24 and through a thermostatic means 26 for controlling the interior temperature of the refrigerator. The compressor, evaporator fan and condenser fan motors 20, 22 and 23 each have return electrical connections to the N supply conductor 16.

The defrost control 24 includes a cam-operated, single-pole double-throw switch 28 operated through a link 29 by a defrost control cam 30 driven by a timing motor 32. When the defrost control switch 28 and the cam 30 are in the cooling position shown, the compressor and evaporator fan motors 20 and 22 are connected through the switch terminals 34 and 36 and through the thermostatic control means 26 to the L supply conductor 14.

The particular thermostatic control means 26 illustrated includes two thermostats, a normal thermostat 38 and a vacation thermostat 40. The normal thermostat 38 is a conventional hydraulic type normally employed in refrigerators, and includes a remote temperature-sensing bulb, represented by an element 41, at the end of a small-diameter tube. The vacation thermostat 40 is a similar thermostat and preferably has a specific fixed temperature adjustment. The vacation thermostat 40 is adjusted to a higher temperature setting than the normal thermostat 38, preferably approximately 5° F. higher than a nominal setting. For example the range of adjustment for the normal fresh food compartment temperature setting is 33° F. to 43° F., with 38° F. being a nominal setting. In this situation, the setting of the vacation thermostat 40 is approximately 5° F. higher than 38° F., which is 43° F.

Alternately, since the normal thermostat 38 is adjustable, the vacation thermostat 40 may also be adjustable and arranged to automatically track the setting of the normal thermostat 38, maintaining a constant 5° F. differential in setting.

In order to alternatively enable the thermostats 38 and 40, a vacation switch 42 is provided. In the illustrated embodiment, the vacation switch 42 is a double-pole, double throw switch comprising sections 44 and 46. When the vacation switch 42 is thrown to the normal position, the switch sections 44 and 46 connect the terminal 36 of the defrost control 24 through the normal thermostat 38 to the L conductor 14. Conversely, when the vacation switch 42 is thrown to the vacation position, the switch sections 44 and 46 connect the terminal 36 of the defrost control 24 through the vacation thermostat 40 to the L supply conductor 14.

In the operation of the circuitry thus far described, either the normal thermostat 38 or the vacation thermostat 40 is enabled to cycle the compressor motor 20, the evaporator fan motor 22 and the condenser fan motor 23 as required to maintain the temperature in the refrigerated compartments. Since the temperature set point of the vacation thermostat 40 is higher than that of the normal thermostat 38, the temperature set point of the thermostatic control means 26 is effectively increased when the zero usage mode is enabled by the vacation switch 42.

Each time the enabled thermostat 38 or 40 closes, power is additionally supplied along a conductor 47 to the defrost control timing motor 32 to rotate the defrost control cam 30. In order to initiate automatic defrosting operations, the timing motor speed and cam arrangement are such that for every six hours of timing motor running time, the cam 30 switches the defrost control switch 28 to the lower position, de-energizing the compressor and evaporator fan motors 20 and 22, and energizing a defrost heater 48. The defrost control switch 28 remains in the lower position for a period of approximately twenty minutes.

The N return for the defrost heater 48 is connected through a defrost-terminating bimetallic switch 50 which is adjusted to open at approximately 50° F. Under normal frost loading conditions, the evaporator is completely defrosted and the bimetallic switch 50 opens within the twenty-minute defrost duration period determined by the defrost control cam 30 and the defrost control timing motor 32.

In order to extend the interval between successive automatic defrosting operations when the vacation switch 42 is in the vacation position to enable the zero usage mode, a defrost interval extending timer 52 is provided. The interval-extending timer 52 has a cam operated switch 54 interposed in series with the defrost control timing motor 32. A motor 56 and a cam 58 operate the switch 54 through a link 59, with a duty cycle which is 10% ON and 90% OFF. The motor and cam arrangement is such that the timer 52 resets by returning the cam 58 to the switch ON position illustrated every time the motor 56 is deenergized. To ensure reasonably accurate duty cycle control despite discontinuities caused by the timer 52 resetting every time the vacation thermostat 40 opens, the cam 58 preferably rotates several times during each cycling of the compressor motor 20. A typical compressor ON cycle lasts for forty minutes, and the cam 58 speed may be eight revolutions per hour. Thus, when the motor 56 and the cam 58 are rotating, the defrost control timing motor 32 is energized approximately only one-tenth as often as would otherwise be the case.

While the particular defrost control 24 illustrated is an electromechanical device, it will be apparent that various other timing means may be employed. For example, an electronic timer may be used, using either RC or digital counter timing elements. Depending upon the precise timer employed, a different means for interrupting the timer may be appropriate, and not necessarily a simple interruption of power.

To prevent interruption of power to the timing motor 32 by the defrost interval extending timer 52 during an automatic defrosting operation, a conductor 60 supplies power to the timing motor 32 continuously when the switch 28 is in the lower position. Otherwise, if the switch 54 happens to open during a defrosting cycle, the compressor and evaporator fan motors 20 and 22 would remain de-energized an excessive length of time.

To energize the defrost extending timer 52 when the vacation switch 42 is thrown to the vacation position, a terminal 61 of the timing motor 56 is connected through a conductor 62 to an upper terminal 64 of the switch section 46. To complete the circuit, the other terminal 66 of the motor 56 is connected through a conductor 68 to the N power source conductor 16.

The refrigerator further includes conventional mullion and case heaters 70 and 71, which serve to prevent condensation forming on the visible outer portions of the refrigerator cabinet. Additionally, there is a butter conditioner heater 72. The mullion, case and butter conditioner heaters 70, 71 and 72 are electrically connected in parallel, and are energized through the switch section 44 and a conductor 73 when the vacation switch 42 is thrown to the normal position. The heaters 70, 71 and 72 are de-energized when the vacation switch 42 is thrown to the vacation position. An N return conductor 74 for the heaters 70, 71 and 72 is connected through the defrost terminating switch 50 to the N power source conductor 16 to prevent the heaters 70, 71 and 72 from operating during those periods when the evaporator temperature exceeds 50° F. during defrosting operations.

The refrigerator further includes an automatic icemaker 76. The automatic icemaker 76 is connected across the conductor 73 and the N supply conductor 16 and functions to supply ice cubes as required so long as it is energized. The icemaker 76 includes an ejection motor 78 in parallel with a mold heater 80, the parallel combination connected in series through a control thermostat 82 and a feeler arm switch 84 to the conductor 73. The icemaker 76 further includes a cam-operated switch 86 having first and second movable contact terminals 88 and 90 and a fixed contact terminal 92. Lastly, an inlet water valve solenoid 94 is connected between the fixed contact terminal 92 and the N supply conductor 16.

Considering the operation of the icemaker 76, it will be assumed that the feeler arm switch 84 is closed, meaning that the ice storage bin (not shown) is not full, and that the icemaker mold is filled with water in the process of being frozen. When the mold temperature reaches approximately 16° F., it is assumed that the water is frozen and the control thermostat 82 closes. This energizes the ejection motor 78 and the mold heater 80. The ejection motor 78 begins rotation, but is immediately stalled by the frozen ice. Before reaching the stalled condition, the ejection motor 78 and an associated cam causes a connection between the movable contact terminals 88 and 90 of the switch 86 to be made, bypassing the feeler arm switch 84 and the control thermostat 82.

The motor 78 remains in a stalled condition for about two minutes until the mold heater has melted the ice a slight amount sufficient to free the ice from the mold. The motor then resumes rotation to eject the ice cubes. At this point, the cam causes a connection to be made between all three of the switch contact terminals 88, 90 and 92, energizing the water valve solenoid 94 for approximately ten seconds. In the meantime, the control thermostat 82 has opened since the mold temperature is raised by the mold heater 80 and incoming tap water. The motor-driven cam reaches the end of its rotation, opening all of the contacts of the switch 86 and stopping operation of the icemaker 76.

In accordance with the present invention, when the vacation switch 42 is thrown to the vacation position to enable the zero usage mode, operation of the icemaker 76 is interrupted. In the illustrated embodiment, power to the entire icemaker 76 is interrupted by the vacation switch 42, which removes power from the conductor 73.

Figure 2:
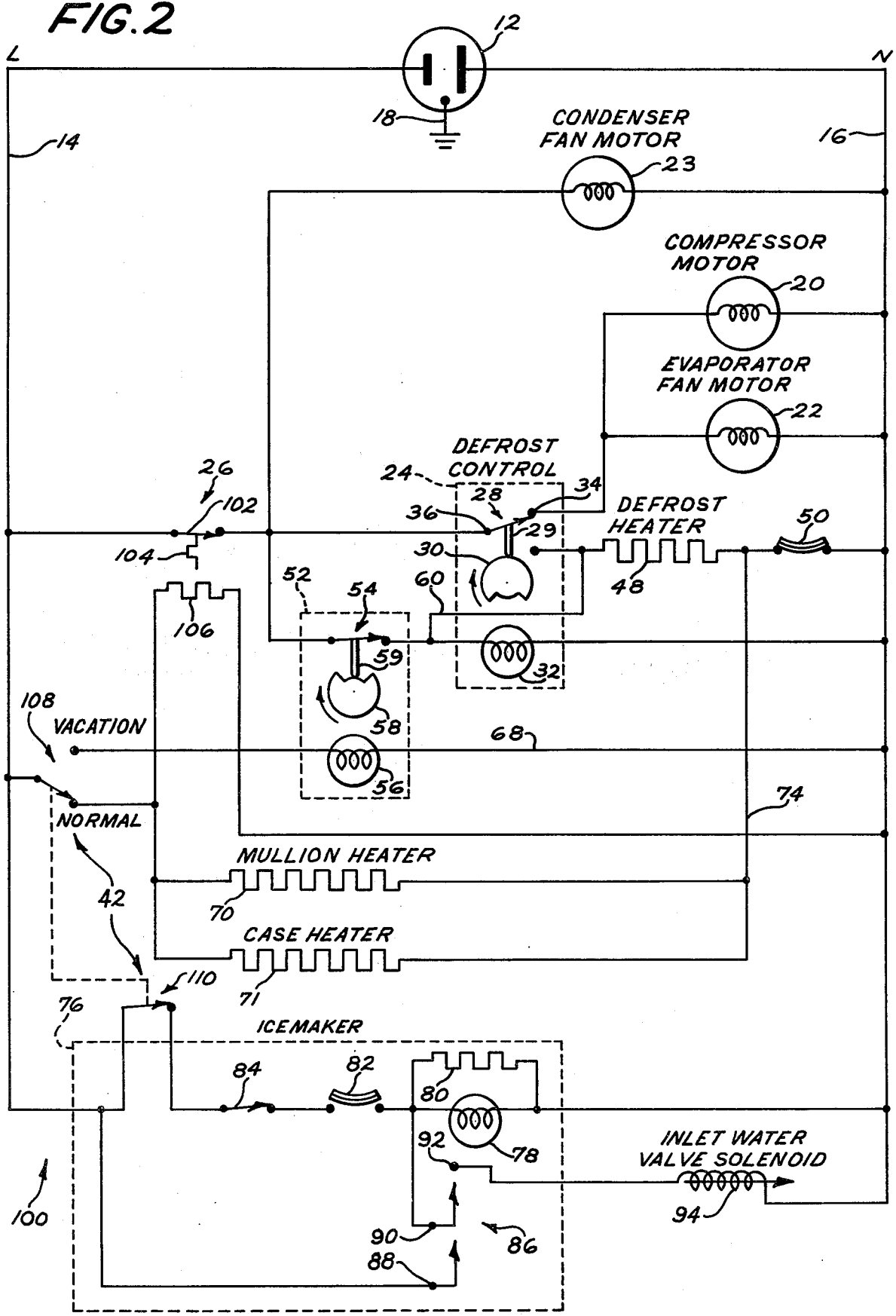
FIG. 2 is an electrical circuit diagram of a refrigerator control system according to another embodiment of the invention.

Referring now to FIG. 2, there is shown a schematic diagram of a circuit 100 according to a second embodiment of the invention. The circuit 100 of FIG. 2 differs from the circuit 10 of FIG. 1 in two respects, discussed below. It will be appreciated that the circuit 100 of FIG. 2 remains unchanged in other respects and a complete description thereof is not repeated.

In FIG. 2, the thermostatic means 26 for controlling the interior temperature of the refrigerator comprises only a single thermostat 102, and there is a different means for increasing the temperature set point of the thermostatic control means 26 when the zero usage mode is enabled by the vacation switch 42. The thermostat 102 has a temperature sensing element 104 located within the refrigerated space. Preferably, the temperature sensing element 104 again is a hydraulic bulb at the end of a small-diameter tube connected to a hydraulic diaphragm which actually operates the contact of the thermostat 102.

To bias the temperature of the refrigerator downward when in the normal mode of operation, there is provided a small-wattage heater 106 for biasing the temperature sensing element 104. The biasing heater 106 may be approximately one-tenth watt and in thermal contact with the temperature sensing element 104. The thermostat 102 is suitably calibrated, taking into account the biasing effect of the heater 106, to maintain the desired temperature within the refrigerated compartments.

The vacation switch 42 in the embodiment of FIG. 2 comprises a double-pole, double-throw switch having sections 108 and 110. When in the normal position illustrated, the switch section 108 energizes, from the L power source conductor 14, the mullion and case heaters 70 and 72 and the biasing heater 106. When the switch section 108 is thrown to the upper or vacation position, the mullion and case heaters 70 and 72 and the biasing heater 106 are de-energized, and the motor 56 of the defrost extending timer 52 is energized.

This de-energization of the biasing heater 106 during the vacation mode has the effect of increasing the temperature set point of the thermostatic control means 26. Since the thermostat 102 is calibrated to take into account the additional heat of the biasing heater 106 to provide normal temperature settings, removal of the heat supplied by the biasing heater 106 causes the temperature set point to increase, thereby maintaining a higher temperature in the refrigerated compartments. It will be appreciated that this arrangement results in a fairly constant temperature differential between the effective temperature setting during the normal mode and the temperature setting during the vacation mode.

The lower switch section 110 of the vacation switch 42 disables the icemaker 76 when the vacation or zero usage mode is enabled, but does so in a manner which prevents interruption of the icemaker 76 during an ice ejection cycle. Interruption of the icemaker 76 during an ice ejection cycle could potentially lead to improper operation of the icemaker upon subsequent restarting. To provide such disabling of the icemaker 76, the switch section 110 is connected in series with the feeler arm switch 84 and the control thermostat 82. If the vacation switch 42 happens to be thrown to the vacation position during an ice ejection cycle, the cycle continues because the first and second movable contact terminals 88 and 90 are closed, effectively bypassing the switch section 110. Upon completion of the ice ejection cycle, the icemaker 76 then becomes entirely disabled because no further ice ejection cycles can be initiated so long as the switch section 110 is open.

Figure 3:
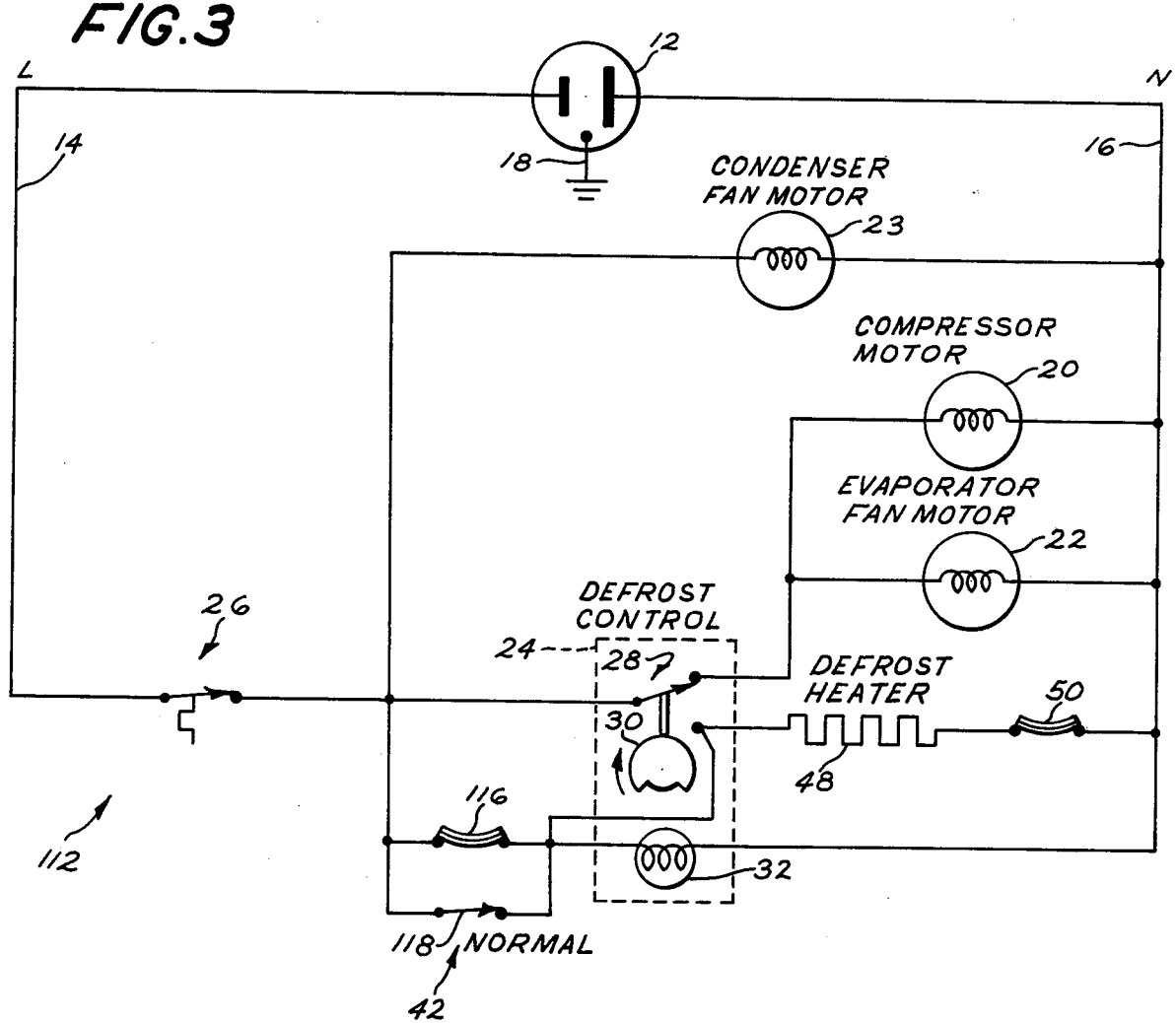
FIG. 3 is an electrical circuit diagram of a refrigerator control system including an arrangement for extending the interval between successive defrosting operations.
Figure 4:
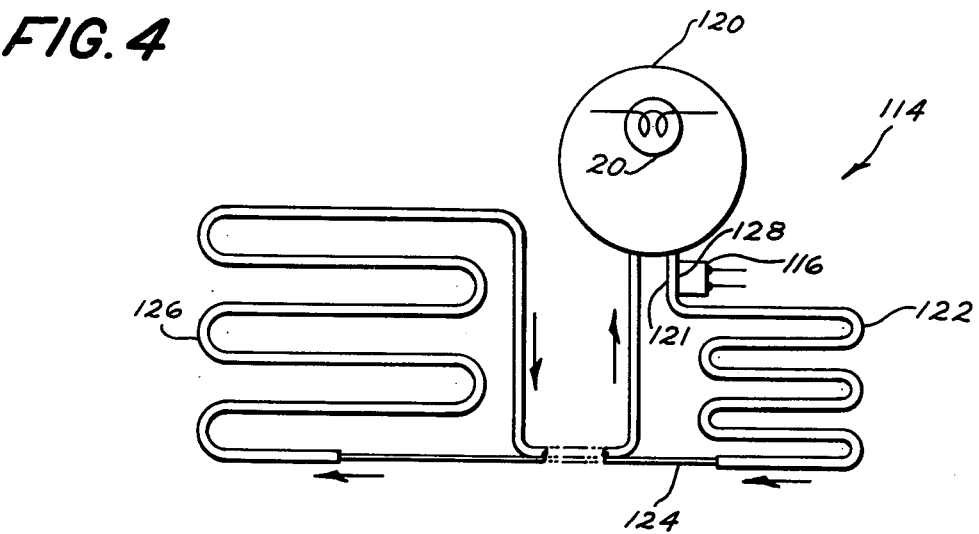
FIG. 4 is a schematic representation of a closed circuit refrigeration system.

Referring now to FIGS. 3 and 4, there is shown a third embodiment of the invention which includes an alternative arrangement for extending the interval between successive defrosting operations. FIG. 3 is a schematic diagram of an electrical circuit 112, and FIG. 4 is a mechanical schematic diagram of a closed circuit refrigeration system 114 which includes elements are shown in the electrical circuit 112 of FIG. 3.

In FIG. 3, the thermostatic control means 26 may be either of the arrangements disclosed in FIG. 1 or FIG. 2, or may be any suitable alternative means which includes a means for increasing the temperature set point when the zero usage mode is enabled by the vacation switch 42.

The defrost control timing motor 32 is connected in series with a thermostatic switch 116. The thermostatic switch 116 is bypassed by a switch section 118, which is a portion of the vacation switch 42. When the vacation switch 42 is thrown to the normal position shown, the defrost control timing motor 32 is energized through the switch section 118 whenever the thermostatic control means 26 supplies power from the L power source conductor 14. However, when the vacation switch is thrown to the vacation position to enable the zero-usage mode, power is supplied to the defrost timing motor 32 only when the thermostatic switch contact 116 is closed. When the thermostatic switch 116 opens, power to the defrost control timing motor 32 is interrupted, extending the interval between successive defrosts.

Referring to FIG. 4, the closed circuit refrigeration system 114 includes a refrigerant compressor 120 including the compressor motor 20, a compressor exhaust line 121, a refrigerant condenser 122, a flow restricting capillary tube 124, and a refrigerant evaporator 126 to provide cooling, all connected in series. The exhaust line 121 and condenser 122, being upstream of the capillary tube 124, carry relatively high pressure refrigerant and hence comprise what is conventionally termed the refrigeration system "high side." The thermostat switch 116 is connected in thermal contact with a portion 128 of the refrigeration system high side, preferably with a portion of the exhaust line 121. Thus, the thermostatic switch 116 is responsive to a temperature of a point on the refrigeration system high side. The thermostatic switch 116 is adjusted such that its contacts are closed under ambient temperature conditions, and open under higher temperature conditions such as are reached by the portion 128 during normal operation.

Figure 5:
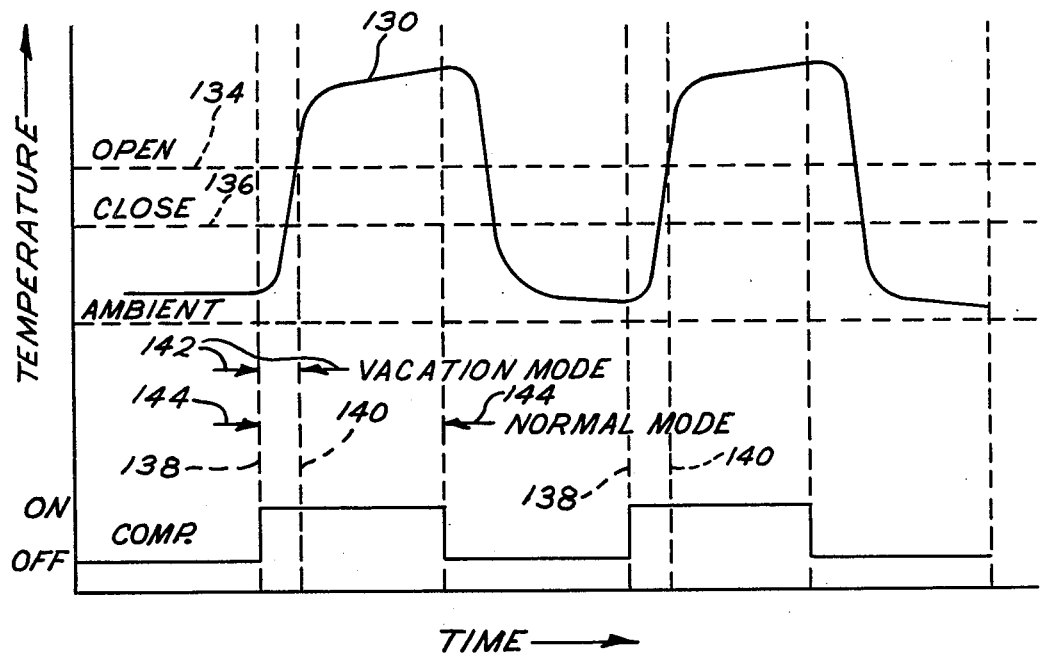
FIG. 5 is a graph depicting the operation of the embodiment of FIGS. 3 and 4.

The operation of the embodiments of FIGS. 3 and 4 will now be described with reference to the graph of FIG. 5. In FIG. 5, an upper line 130 represents the temperature of the portion 128 on the refrigeration system high side as a function of time as the compressor 120 cycles ON and OFF in response to the thermostatic control means 26. A lower line 132 represents whether the compressor 120 in ON or OFF any particular moment in time.

From FIG. 5, it can be seen that when the compressor 120 is OFF, the temperature of the portion 128 approaches ambient temperature. During each operation of the compressor 120, the temperature of the portion 128 increases as the operation cycle proceeds. From the graph, it can be seen that the temperature rise near the beginning of each cycle is fairly steep. When the compressor 120 cycles OFF, the temperature falls toward ambient temperature.

The temperature at which the thermostatic switch 116 opens is shown by the horizontal dash line 134, and the temperature at which it again closes is shown by the horizontal dash line 136. As these two temperatures are unequal, the thermostatic switch 116 has a hysteresis characteristic.

Assuming the vacation mode is selected and the vacation switch section contacts 118 are therefore open, at the beginning of each compressor operating cycle, the thermostatic switch 116 is closed and power is supplied to the defrost timing motor 32. This beginning point is represented by the first vertical dash lines 138. Shortly into the operating cycle, the temperature represented by the dash line 134 is reached and the thermostatic switch 136 opens. Power to the defrost control timing motor 32 is interrupted. This terminating point is represented by the second vertical dash lines 140. Power is not again supplied to the defrost timing motor 32 until the beginning of the next compressor operating cycle. Thus, power is supplied to the timing motor 32 during only a portion of each compressor operating cycle, effectively extending the time interval between defrosts. The cycle portion during which the timing motor 32 is energized is shown in FIG. 5 between a pair of arrows 142 bearing the legend "vacation mode."

When the normal mode is selected and the switch section contacts 118 are closed, the thermostatic switch 116 is bypassed and the defrost control timing motor 32 is energized during the entirety of each compressor operation cycle. In this case, the cycle portion during which the timing motor 32 is energized is shown between a pair of arrows 144 bearing the legend "normal mode."

In the embodiment of FIGS. 3 and 4, it will be apparent that the temperature at which the thermostatic switch 116 opens and the location of the thermostatic switch 116 on the refrigeration system high side may be experimentally varied to achieve various time delay intervals.

While the defrost interval extending arrangement of FIGS. 3 and 4 is illustrated and described as controlled by a switching means comprising the vacation switch 42 for selecting either normal or extended intervals between successive defrosting operations, it will be appreciated that this aspect of the invention is not so limited. The switching means for selecting either normal or extended intervals between successive defrosting operations may comprise any switching means responsive to a need to extend defrosting intervals.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An automatically-defrosting household refrigerator including an automatic icemaker comprising:
   a user-operable vacation switch effective to enable the operation of said refrigerator in a mode appropriate to a condition of zero usage, including extending the interval between successive automatic defrosting operations and disabling the icemaker.

2. A refrigerator according to claim 1, further comprising means for preventing the interruption of said icemaker during an ice-ejection cycle.

3. An automatically-defrosting household refrigerator including an electrical anti-condensation heater for an external portion of said refrigerator, comprising:
a user-operable vacation switch effective to enable the operation of said refrigerator in a mode appropriate to a condition of zero usage, including extending the interval between successive automatic defrosting operations and disabling the anti-condensation heater.

4. A refrigerator according to claim 3, further comprising:
thermostatic means for controlling the interior temperature of said refrigerator, said thermostatic control means having a temperature set point; and
means for increasing the temperature set point of said thermostatic control means when the zero usage mode is enabled by said vacation switch.

5. A refrigerator according to claim 4, wherein said means for increasing the temperature set point of said thermostatic control means comprises:
the thermostatic control means having a normal thermostat and a vacation thermostat, said vacation thermostat adjusted to a higher temperature setting than said normal thermostat; and
circuit means for alternatively enabling said thermostats, said vacation thermostat being enabled when the zero usage mode is enabled by said vacation switch.

6. A refrigerator according to claim 4, wherein said thermostatic control means has a temperature sensing element located within the refrigerated space; and
wherein said means for increasing the temperature set point of said thermostatic control means comprises:
heater means for biasing said temperature sensing element; and
means for disabling said biasing heater means when the zero usage mode is enabled by said vacation switch.

7. An automatically-defrosting household refrigerator including thermostatic means for controlling the interior temperature of said refrigerator, said thermostatic control means having a temperature set point, comprising:
a user-operable vacation switch effective to enable the operation of said refrigerator in a mode appropriate to a condition of zero usage, including extending the interval between successive automatic defrosting operations and increasing the temperature set point of said thermostatic control means.

8. A refrigerator according to claim 7, wherein said means for increasing the temperature set point of said thermostatic control means comprises:
the thermostatic control means having a normal thermostat and a vacation thermostat, said vacation thermostat adjusted to a higher temperature setting than said normal thermostat; and
circuit means for alternatively enabling said thermostats, said vacation thermostat being enabled when the zero usage mode is enabled by said vacation switch.

9. A refrigerator according to claim 7, wherein said thermostatic control means has a temperature sensing element located within the refrigerated space; and
wherein said means for increasing the temperature set point of said thermostatic control means comprises:
heater means for biasing said temperature sensing element; and
means for disabling said biasing heater means when the zero usage mode is enabled by said vacation switch.

10. A refrigerator according to claim 1, further comprising a defrost interval control timer; and
wherein means for extending the interval between successive automatic defrosting operations comprises means for periodically interrupting said defrost interval control timer when the zero usage mode is enabled by said vacation switch.

11. A refrigerator according to claim 10, wherein said defrost interval control timer is motor driven; and
said means for periodically interrupting said defrost interval control timer comprises a cam-operated switch connected electrically in series with the motor of said defrost control timer.

12. In an automatically defrosted refrigerator including a refrigerant compressor, a refrigeration system high side having a compressor exhaust line and a refrigerant condenser, and timing means for determining the interval between successive defrosting operations, an arrangement for extending the interval between successive defrosting operations, which arrangement comprises:
switching means for selecting either normal or extended intervals between successive defrosting operations;
a temperature responsive switch responsive to the temperature of a point on said refrigeration system high side; and
means responsive to said switching means for enabling said timing means continuously during operation of said compressor when said switching means is selecting normal defrost intervals, and for disabling said timer means when the temperature sensed by said temperature responsive switch exceeds a predetermined value during each operation of said compressor when said switching means is selecting extending defrost intervals.

13. A refrigerator according to claim 12, wherein said switching means is a vacation switch effective to enable the operation of the refrigerator in a mode appropriate to a condition of zero usage, the mode appropriate to a condition of zero usage including extending the normal interval between successive automatic defrosting operations.

* * * * *